United States Patent

Park

Patent Number: 5,553,910
Date of Patent: Sep. 10, 1996

[54] DEVICE FOR REINFORCING A DOOR OF A PASSENGER CAR

[75] Inventor: Young H. Park, Kyungnam-Do, Rep. of Korea

[73] Assignee: Hyundai Motor Co., Ulsan, Rep. of Korea

[21] Appl. No.: 398,169

[22] Filed: Mar. 2, 1995

[30] Foreign Application Priority Data

Mar. 5, 1994 [KR] Rep. of Korea .................. 94-4172

[51] Int. Cl.⁶ .................................................. B60R 27/00
[52] U.S. Cl. .................. 296/188; 296/146.6; 49/502
[58] Field of Search .................... 296/146.6, 189, 296/188; 49/502, 501

[56] References Cited

U.S. PATENT DOCUMENTS

| | | | |
|---|---|---|---|
| 3,882,970 | 5/1975 | Newman | 296/146.6 |
| 4,702,515 | 10/1987 | Kato et al. | 296/189 |
| 5,056,861 | 10/1991 | Garnweidner et al. | 296/146.6 |
| 5,404,690 | 4/1995 | Hanf | 296/146.6 |

FOREIGN PATENT DOCUMENTS

| | | | |
|---|---|---|---|
| 1480089 | 8/1969 | Germany | 49/502 |
| 4008111A | 9/1991 | Germany | 49/502 |
| 4224303A1 | 1/1994 | Germany | 296/146.6 |
| 404300716A | 10/1992 | Japan | 296/146.6 |
| 405169974A | 7/1993 | Japan | 296/146.6 |

*Primary Examiner*—Gary C. Hoge
*Attorney, Agent, or Firm*—Birch, Stewart, Kolasch & Birch, LLP

[57] ABSTRACT

A device for reinforcing a passenger car door includes an inverted T-shaped upper reinforcing member positioned adjacent an outer door handle, and a lower impact beam which is horizontally disposed and parallel to the upper reinforcing member within a passenger car door for absorbing any impact to the passenger car door and preventing the passenger car door from twisting.

19 Claims, 1 Drawing Sheet

DEVICE FOR REINFORCING A DOOR OF A PASSENGER CAR

BACKGROUND OF THE INVENTION

1. Field of the Invention

The present invention relates to an attachment device for reinforcing a door of a passenger car and more particularly, to an improved attachment device including an inverted T-shaped upper reinforcing member and a lower impact beam which are both horizontally disposed in parallel within a passenger car door for absorbing impact and preventing the door from twisting.

2. Description of Related Art

Various types of attachment devices for reinforcing a passenger car door are generally in the art to be utilized with a horizontally, elongated C-shaped rod attached to an inside surface of a passenger car door. In this case, the C-shaped rod includes four adhesive portions located on two corners and two ends thereof and extending therefrom. The four adhesive portions have a grooved configuration for holding a sealer, respectively, for attaching the C-shaped rod to on outside door panel of the car door. However, such attachment devices suffer from a number of problems including a serious problem of twisting of the outside door panel of the car door since the grooved, configured four adhesive portions can be easily twisted by any impact, and it is difficult to absorb, scatter, and eliminate any impact for the door. Further, it is difficult to reinforce the outside door panel, and it is difficult to save an outer door handle under impact.

SUMMARY OF THE INVENTION

Accordingly, it is an object of the present invention to provide an attachment device for reinforcing a door of a passenger car, preferably a three-door passenger car, which eliminates the above problems encountered with conventional attachment devices.

Another object of the present invention is to provide an improved attachment device including an inverted T-shaped upper reinforcing member and a lower impact beam which are both horizontally disposed in parallel within a passenger car door for absorbing any impact and preventing the passenger car door from twisting.

A further object of the present invention is to provide an upper reinforcing member including a body member which has a plurality of horizontal splits and a peripheral flange and a plurality of flange adhesive projections, and a reinforcing plate which has a plurality of vertical splits and a C-shaped adhesive channel, wherein the upper reinforcing member is tightly attached to an inner surface of the outside door panel for reinforcing a passenger car door and eliminating any impact damage to the passenger car door.

Still another object of the present invention is to provide an attachment device for reinforcing a door of a three-door passenger car which is simple in structure, inexpensive to manufacture, and easy to assemble with the passenger car door.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an attachment device including an inverted T-shaped upper reinforcing member adjacent an outer door handle, which has a plurality of splits and flange projections, and a lower impact beam which are both horizontally disposed in parallel within a passenger car door for absorbing any impact to the passenger car door and preventing the passenger car door from twisting.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 2:
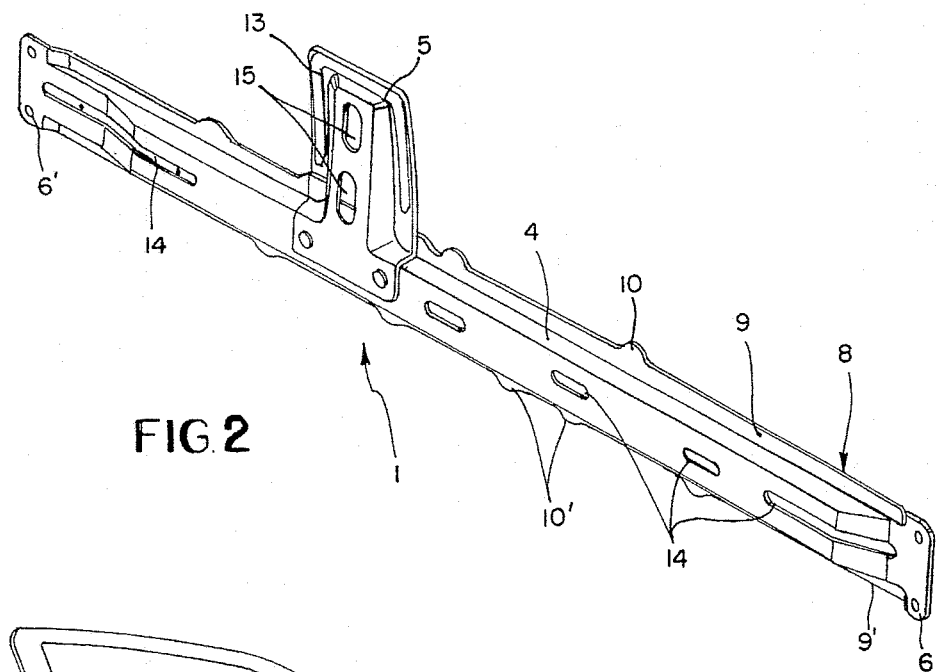
FIG. 2 is a perspective view of an upper reinforcing member of the attachment device according to the present invention.
Figure 1:
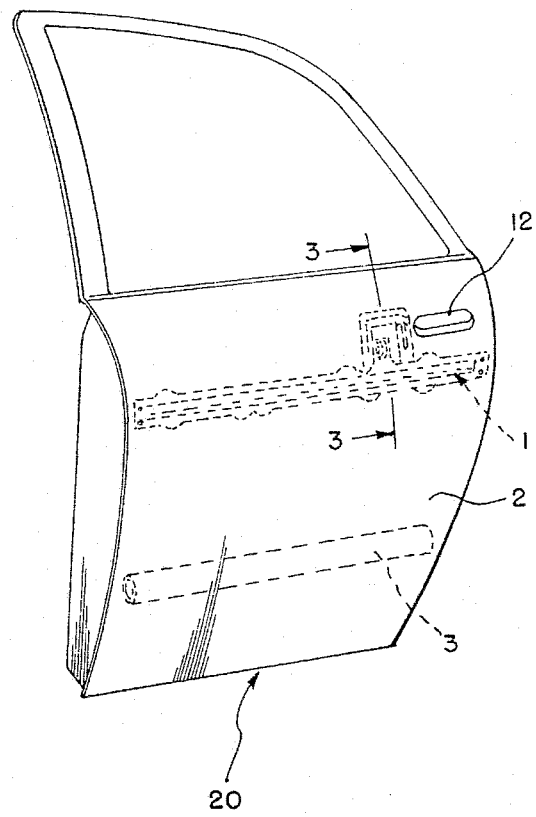
FIG. 1 is a perspective view of a passenger car door, which utilizes an attachment device as shown in dotted lines, inserted into the door according to the present invention.
Figure 3:
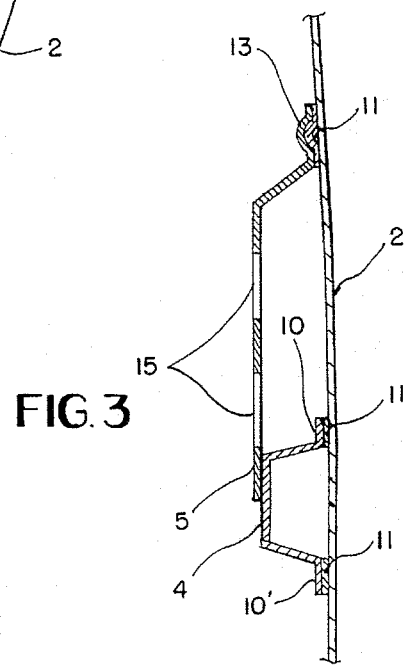
FIG. 3 is a sectional view of FIG. 1, taken along line 3—3.

Referring now in detail to the drawings for the purpose of illustrating preferred embodiments of the present invention, the attachment device for reinforcing a door of a passenger car as shown in FIGS. 1, 2, and 3 includes an upper reinforcing member 1 and a lower impact beam 3 which are horizontally spaced apart from each other, disposed in parallel and mounted on an inside of an outside door panel 2 of a door 20 of a three-door passenger car.

The upper reinforcing member 1 is formed as an inverted T-shaped configuration and includes a body member 4 and a reinforcing plate 5 attached to the body member at about one third of an overall length of the body member 4 and from a right flange end 6' of the body member 4 (FIG. 2) for retaining reinforcement of the outside door panel 2 and absorbing any impact to the door 20.

As shown in FIG. 2, the body member 4 is a horizontally positioned and elongated beam. Also, the body member 4 has a C-shaped, inwardly opening configuration and an outwardly extended peripheral flange 8.

The peripheral flange 8 includes a left flange end 6 and the right flange end 6' and an upper flange 9 and a lower flange 9'. The upper flange 9 includes a plurality of upper adhesive projecting portions 10 extending therefrom. The lower flange 9' includes a plurality of lower adhesive projecting portions 10' extending therefrom. The upper and lower adhesive projections 10 and 10' are tightly attached to an inside surface of the 25 outside door panel 2 through a sealer 11.

The C-shaped body member 4 includes a plurality of horizontally elongated slits 14 for absorbing and simultaneously dispersing any impact on the outside door panel 2 of the door 20. In other words, any physical compressional stress to the area surrounding the slit 14 will find some room for movement into the space defined by the slit 14. Likewise, an expansion of the C-shaped body member 4 will be possible instead of tearing of the material, since the slit 14 is pre-formed therein.

The reinforcing plate 5 attached to the body member 4 for forming the inverse T-shape, includes a C-shaped adhesive channel 13 for tightly attaching to the inside surface of the outside door panel 2 through the sealer 11 and a plurality of vertically elongated slits 15 for absorbing and simultaneously dispersing any impact including impact from an outer door handle 12 of the door 20. In other words, any physical compressional stress to the area surrounding the slit 15 will find some room for movement into the space defined by the slit 15. Likewise, an expansion of the reinforcing plate 5 will be possible instead of tearing of the material, since the slit 15 is pre-formed therein. The reinforcing plate 5 is positioned adjacent to the outer door handle 12 so as to absorb impact directed toward the handle 12 from the door 20.

The lower impact beam 3 is spaced apart from the upper reinforcing member 1 for preventing the outside door panel 2 from twisting under impact such as a car accident, door handle impact, and the like. Particularly, the impacts are to be absorbed, dispersed, and essentially eliminated by the plurality of slits 14 and 15 disposed on the body member 4 and the reinforcing plate 5.

Accordingly, the attachment device according to the present invention is simple in structure, inexpensive to manufacture, and easy to assemble with the passenger car door 20 of a passenger car.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for reinforcing a door of a passenger car, comprising:

an upper reinforcing member including a body member and a reinforcing plate, said body member having a plurality of horizontal slits disposed therein and flanged adhesive-backed projections extending from a peripheral flange thereof, said reinforcing plate having a plurality of vertical slits and a C-shaped adhesive channel, the upper reinforcing member being attached to an inside of an outer door panel through the adhesive-backed projections and the adhesive channel; and a lower impact beam disposed in parallel with said upper reinforcing member, said upper reinforcing member and lower impact beam being disposed within the door, whereby attachment of said upper reinforcing member and said lower impact beam reinforces a door and absorbs any impact to the door.

2. The device according to claim 1, wherein said upper reinforcing member has an inverted T-shaped configuration with said reinforcing plate positioned adjacent to and said body member positioned proximally below an outer door handle.

3. The device according to claim 1, wherein said reinforcing plate is located at one third of a longitudinal distance of said upper reinforcing member and from an end of said upper reinforcing member adjacent an outer door handle.

4. A device for reinforcing a door of a passenger car having an outside door panel with inner and outer surfaces and a door handle located on the outer surface of the door, said device comprising:

an upper reinforcing member including an elongated body member having an elongated internal cavity, an outer peripheral flange, and at least one elongated slit formed through a surface of the elongated body member, a reinforcing plate provided in connection with said elongated body member, said reinforcing plate having an internal cavity and at least one elongated slit formed through a surface thereof, means for attaching said elongated body member to the inner surface of the outside door panel, and means for attaching said reinforcing plate to the inner surface of the outside door panel; and a lower impact beam spaced apart from said upper reinforcing member, said lower impact beam being mounted to the inner surface of the outside door panel, wherein said outer peripheral flange is formed around the periphery of said body member and said means for attaching said elongated body member to the inner surface of the outside door panel includes at least one projecting portion formed on the outer peripheral flange for receiving an adhesive, the adhesive securing said body member to the inner surface of the outside door panel, and whereby the combination of said upper reinforcing member and said lower impact beam prevents twisting of the door under impact thereto.

5. The device according to claim 4, wherein said means for attaching said reinforcing plate to the inner surface of the outside door panel includes a channel formed around at least a portion of the periphery of said reinforcing plate for receiving an adhesive, the adhesive securing said reinforcing plate to the inner surface of the outside door panel.

6. The device according to claim 4, wherein said reinforcing plate is positioned adjacent to the door handle.

7. The device according to claim 4, wherein said reinforcing plate is mounted to said elongated body member to form an inverted T-shape in combination.

8. The device according to claim 4, wherein said upper reinforcing member further includes opposing flange ends, a first one of said opposing flange ends being positioned at an end of the door having the handle, and a second one of said opposing flange ends being positioned at a remaining end.

9. The device according to claim 8, wherein said reinforcing plate is mounted to said elongated body member at a distance one-third a length of said upper reinforcing member from the first flange end thereof.

10. The device according to claim 9, wherein said reinforcing plate is mounted to said elongated body member to form an inverted T-shape in combination.

11. The device according to claim 4, wherein said upper reinforcing member and said lower impact beam are mounted parallel to each other within the door.

12. A device for reinforcing a door of a passenger car having an outside door panel with inner and outer surfaces and a door handle located on in the outer surface of the door, said device comprising:

an upper reinforcing member including an elongated body member having an elongated internal cavity, an outer peripheral flange, and at least one elongated slit formed through a surface of the elongated body member, a reinforcing plate provided in connection with said elongated body member, said reinforcing plate having an internal cavity and at least one elongated slit formed through a surface thereof, wherein said reinforcing plate is positioned adjacent to the door handle, means for attaching said elongated body member to the inner surface of the outside door panel, and means for attaching said reinforcing plate to the inner surface of the outside door panel; and a lower impact beam spaced apart from said upper reinforcing member, said lower impact beam being mounted to the inner surface of the outside door panel, whereby the combination of said upper reinforcing member and said lower impact beam prevents twisting of the door under impact thereto.

13. The device according to claim 12, wherein said outer peripheral flange is formed around the periphery of said body member, and wherein said means for attaching said elongated body member to the inner surface of the outside door panel includes at least one projecting portion formed on the outer peripheral flange for receiving an adhesive, the adhesive securing said body member to the inner surface of the outside door panel.

14. The device according to claim 12, wherein said means for attaching said reinforcing plate to the inner surface of the outside door panel includes a channel formed around at least a portion of the periphery of said reinforcing plate for receiving an adhesive, the adhesive securing said reinforcing plate to the inner surface of the outside door panel.

15. The device according to claim 12, wherein said reinforcing plate is mounted to said elongated body member to form an inverted T-shape in combination.

16. The device according to claim 12, wherein said upper reinforcing member further includes opposing flange ends, a first one of said opposing flange ends being positioned at an end of the door having the handle, and a second one of said opposing flange ends being positioned at a remaining end.

17. The device according to claim 14, wherein said reinforcing plate is mounted to said elongated body member at a distance one-third a length of said upper reinforcing member from the first flange end thereof.

18. The device according to claim 17, wherein said reinforcing plate is mounted to said elongated body member to form an inverted T-shape in combination.

19. The device according to claim 12, wherein said upper reinforcing member and said lower impact beam are mounted parallel to each other within the door.

\* \* \* \* \*